May 29, 1962

E. C. KOIVULA 3,036,718

TONG THROWER

Filed March 13, 1961

INVENTOR.
ELMER C. KOIVULA
BY
ATTYS.

May 29, 1962 E. C. KOIVULA 3,036,718
TONG THROWER
Filed March 13, 1961 10 Sheets-Sheet 2

INVENTOR.
ELMER C. KOIVULA
BY Wells & St. John
ATTYS.

May 29, 1962  E. C. KOIVULA  3,036,718
TONG THROWER
Filed March 13, 1961  10 Sheets-Sheet 3

INVENTOR.
ELMER C. KOIVULA
BY
Wells & St. John
ATTYS.

May 29, 1962  E. C. KOIVULA  3,036,718
TONG THROWER

Filed March 13, 1961  10 Sheets-Sheet 4

INVENTOR.
ELMER C. KOIVULA
BY
ATTYS.

May 29, 1962  E. C. KOIVULA  3,036,718
TONG THROWER
Filed March 13, 1961  10 Sheets-Sheet 6

INVENTOR.
ELMER C. KOIVULA
BY Wells & St. John
ATTYS.

May 29, 1962 E. C. KOIVULA 3,036,718
TONG THROWER
Filed March 13, 1961 10 Sheets-Sheet 7

INVENTOR.
ELMER C. KOIVULA
BY
ATTYS.

May 29, 1962 E. C. KOIVULA 3,036,718
TONG THROWER

Filed March 13, 1961 10 Sheets-Sheet 10

INVENTOR.
ELMER C. KOIVULA
BY
*Wells & St. John*
ATTYS.

United States Patent Office 3,036,718
Patented May 29, 1962

1

3,036,718
TONG THROWER
Elmer C. Koivula, E. 8803 Grace St., Spokane, Wash.
Filed Mar. 13, 1961, Ser. No. 95,410
14 Claims. (Cl. 212—7)

This invention relates to an attachment for logging booms adapted to propel logging tongs from the location of the boom to their working position.

In logging operations it is customary to use tongs mounted on a boom to move the logs from their random positions to a central loading area for transportation purposes. This is often accomplished with a heel boom or a derrick type boom. In order to move a tong to the position of the logs it is necessary to either carry the tongs manually, often over a distance of 400 feet, or to throw the tongs by using the boom assembly as a lever. However even the most skillful operator can seldom move tongs more than 100 feet by use of this method. Thus manual carrying of the tongs is a necessity in such logging operations.

It is a first object of this invention to provide a machine which is capable of throwing tongs a distance which will eliminate the manual carrying of the tongs to the logs. This is to be accomplished by a simple attachment which can be readily adapted to any of the common booms whether they be of the heel boom type or the derrick type.

It is another object of this invention to provide such an apparatus which will automatically adjust itself to the proper angular elevation for the maximum trajectory of the tong when propelled. In addition, this apparatus is adapted to automatically return into place adjacent the boom after the tongs have been propelled to thereby remain out of the way and to be in position to receive the tongs for the next throw.

It is another object of this invention to provide a device which can supply the necessary force to throw the tongs the required distance without the use of heavy springs or chemical power. According to this invention the power needed to throw the tongs is supplied by the use of an air cylinder which is charged by pulling the tongs rearwardly using the winch mechanism found in such boom assemblies.

It is a final object of this invention to provide a tong throwing device which is controlled by the normal boom control for the winch and boom and which can thereby be readily adapted to any boom and requires no special training for operation.

These and further objects will be evident from a study of the following disclosure taken in conjunction with the accompanying drawings which show a preferred form of this invention mounted on two different types of booms. It is to be understood at the offset that this embodiment is not meant to be a limiting factor of the invention. The invention itself covers the concepts disclosed herein and is defined in the claims following the disclosure.

In the drawings:

FIGURE 6 is a composite figure including:
FIGURE 6B showing the remaining right hand end of the assembly also in side view;

FIGURE 7 is a composite view including:
FIGURE 7B which shows the remaining right hand portion of the bom and tong thrower also in a top view;

Figure 3:
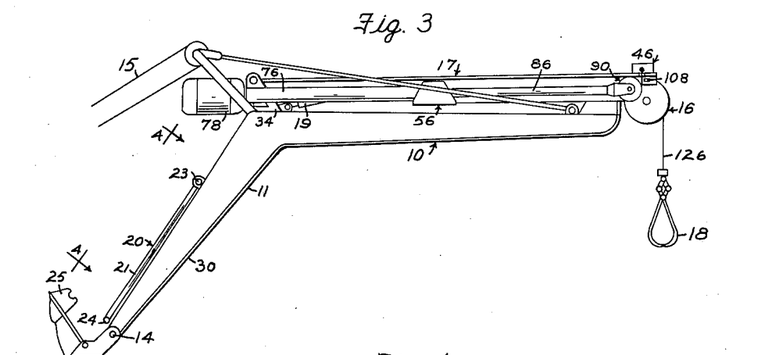
FIGURE 3 is a fragmentary view of the log heel boom shown in FIGURE 1 with the tong thrower shown in its position adjacent the heel boom during the retrieval of the tongs.

Referring now to the drawings, and to FIGURES 1, 2 and 3 in particular, the general concepts of this invention will be explained. In these three figures the invention is shown as mounted on a heel boom generally designated by the numeral 10. This type of heel boom is commonly used in logging operations to pick up logs in the field and to drag them to the vicinity of the boom where they are lifted vertically with one end of the log abutting the heel 11 of the boom 10. The boom 10 can then be swung to any desired position and can accurately place the logs where desired, such as on a truck or railway car. Such booms are conventional and come in many styles, yet all have the common arrangement of an angularly formed boom 10 pivoted to a mounting framework generally designated by the numeral 12. The framework 12 is a mobile framework, but may be of any other desired type. The boom 10 is controlled by an operator in a cab 13 and can be angularly adjusted in a vertical plane about a mounting pivot 14 by means of control guide wires 15. Such controls are conventional and need not be further explained herein. At the outboard end of the boom 10 is mounted a sheave assembly 16 which will be further explained in detail hereafter. It is to be understood that such sheave assemblies are used on heel booms in conventional usage. However, the particular sheave assembly disclosed within the following discussion is designed primarily for use in conjunction with the tong thrower which forms the principal part of this invention.

The tong thrower consists of a frame generally designated by the numeral 17 and pivotally mounted at one end to the boom. The frame 17 slidably carries a propelling device to be described later which projects the tongs 18 from the vicinity of the boom 10. The frame 17 is angularly elevated by a cylinder assembly generally designated by the numeral 19. The heel boom 10 is adapted to be limited in its upward movement by means of a movable brace assembly generally designated by the numeral 20.

Figures 1, 2:
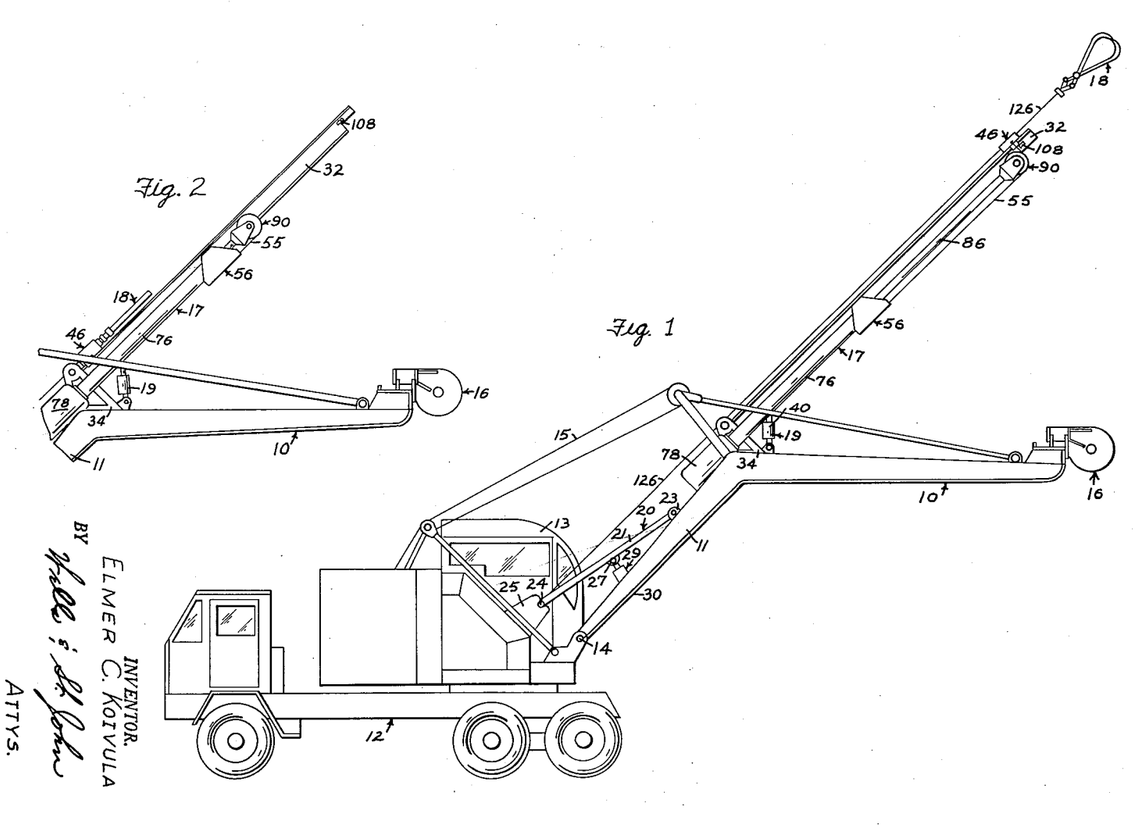
FIGURE 1 is a side view of a heel boom equipped with the tong thrower made according to this invention, the tong thrower being shown in its elevated position immediately after the release of the tongs.
FIGURE 2 is a fragmentary view similar to FIGURE 1 showing the tong thrower in its fully loaded position in readiness for the throwing of the tongs.

In general the operation of this assembly consists of the pivoting of the frame 17 to the position shown in FIGURE 2 where the device is in readiness for the propelling of the tongs 18. This pivotal motion is accomplished by means of the assembly 19. The tongs 18 are then propelled from the boom 10 at a trajectory of 45 degrees as seen in FIGURE 1. After the tongs 18 are released the frame 17 returns to a position adjacent to the boom 10 by release of the assembly 19. It then assumes the position shown in FIGURE 3 wherein the tongs 18 are freely carried over the sheave assembly 16 in normal fashion. After the log has been retrieved the tongs 18 are pulled over the sheave assembly 16 until the tongs 18 abut the tong thrower and are then used to reload the assembly to the position shown in FIGURE 2. This operation may be repeated for each placement of the tongs 18.

Figure 4:
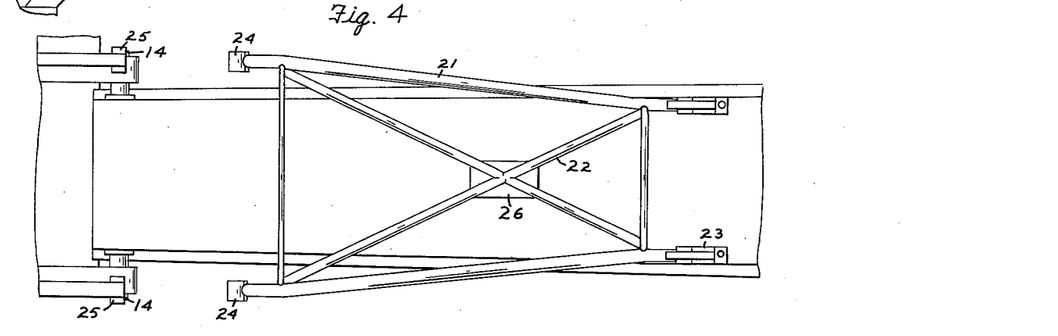
FIGURE 4 is a view taken along line 4—4 in FIGURE 3 showing the top side of the boom brace.
Figure 5:
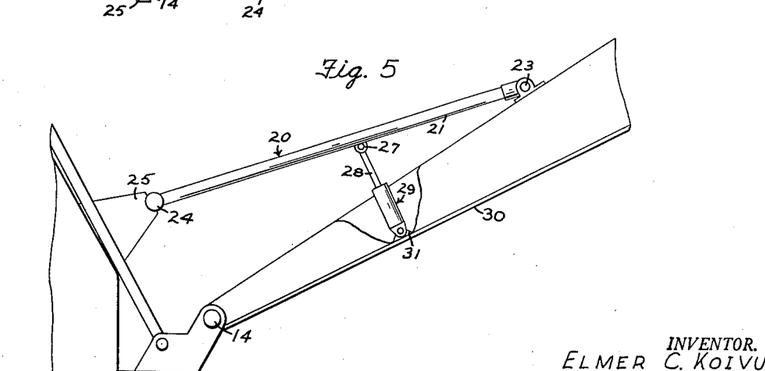
FIGURE 5 is a side view of the apparatus shown in FIGURE 4 with a portion of the boom structure broken away and showing the brace in its projected position abutting the framework of the boom mount.

The various portions of this invention will now be described in detail. The brace assembly 20 is shown in FIGURES 4 and 5. This assembly is necessitated by the fact that ordinary boom assemblies are not provided with any brace means to prevent tilting of the boom in an upward position, or in a counter clockwise direction as seen in FIGURE 1. Such an operation is normally not required of these booms. In order to provide a movable barrier to limit such upward movement and also in order to provide a constant angular position of the boom during the use of this invention, it is necessary to incorporate on the heel 11 the brace assembly 20 to be described now. The assembly 20 consists of a rigid frame having side members 21 and connecting diagonal bars 22 all of which are welded to form a rigid brace structure. The upper ends of the side members 21 are pivotally mounted to the top of the heel 11 by means of pivot 23. The lower ends of the members 21 have fixed thereon transverse circular abutments designated by the numeral 24. These abutments 24 are adapted to be received within fixed concave sockets 25 which are mounted in fixed relation on framework 12. The center of the braces 22 are provided with a mounting plate 26 having ears 27 formed on the lower surface thereof. Between the ears 27 is pivotally mounted the end of a piston rod 28 in a cylinder assembly 29. The lower end of the cylinder assembly 29 is pivotally mounted on the heel plate 30 of the heel 11 by means of an upwardly extending ear 31. By extension of the cylinder assembly 29 the abutments 24 can be brought into position to be received by the sockets 25 when the beam 10 is tilted in a counter clockwise direction as seen in FIGURE 1. Since the complete extension of cylinder 29 will be a constant length the angle of the boom 10 will be the same each time the abutments 24 are brought into their fixed position with respect to the sockets 25. In this manner the boom 10 can be easily brought into the same position each time the tong thrower is to be used.

Figures 6, 6B:
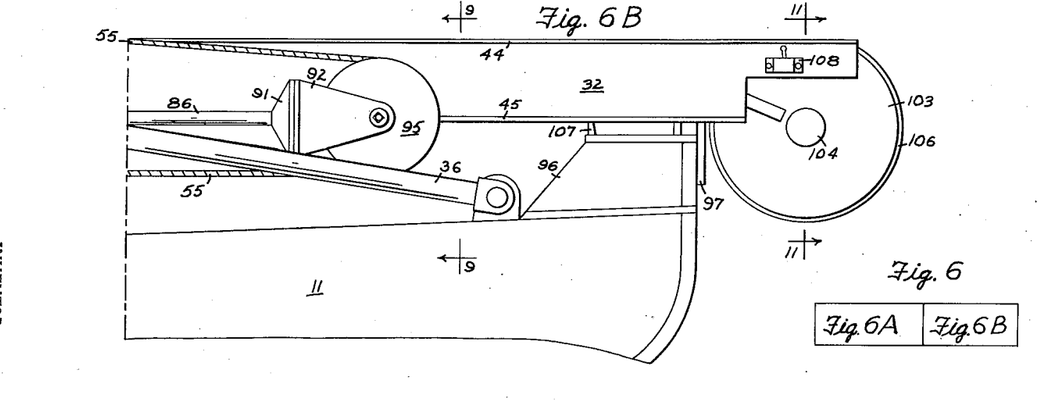
Figure 6A:
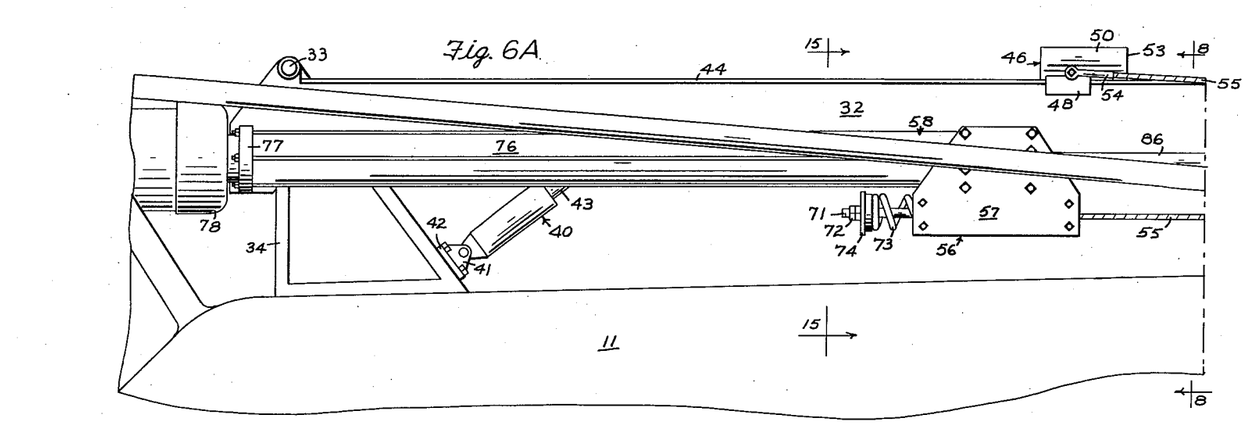
FIGURE 6A which shows the left hand end of the boom and tong thrower assembly in a side view.
Figures 7, 7B:
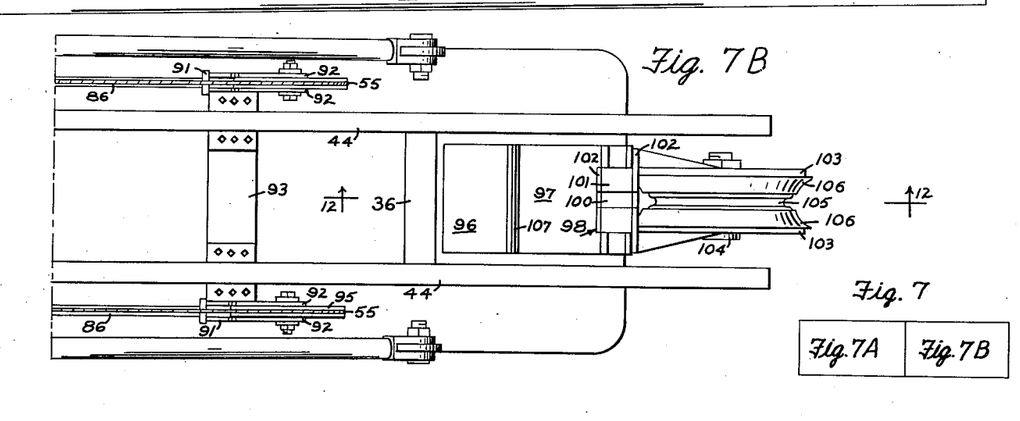
Figure 7A:
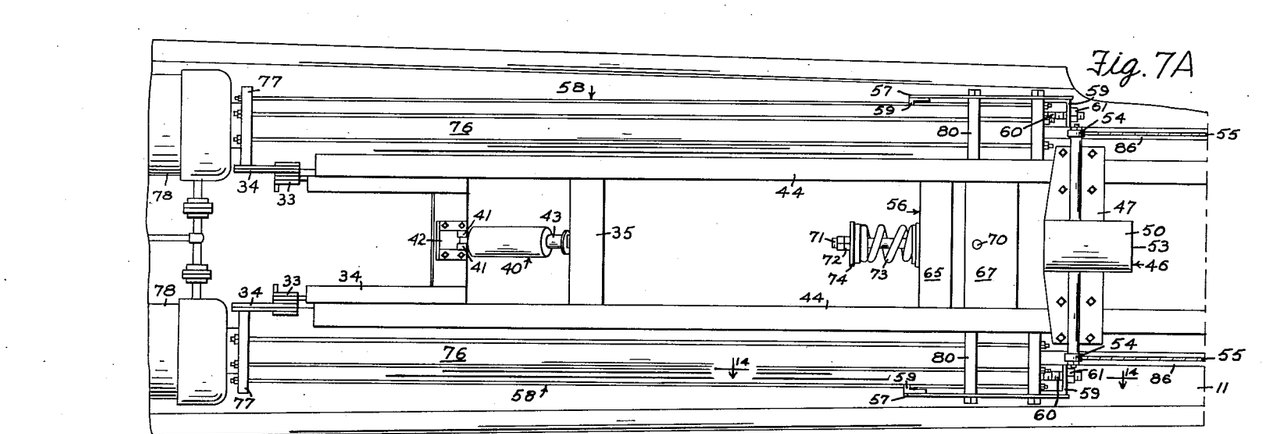
FIGURE 7A which shows the left hand section of the boom and tong thrower in a top view.
Figure 8:
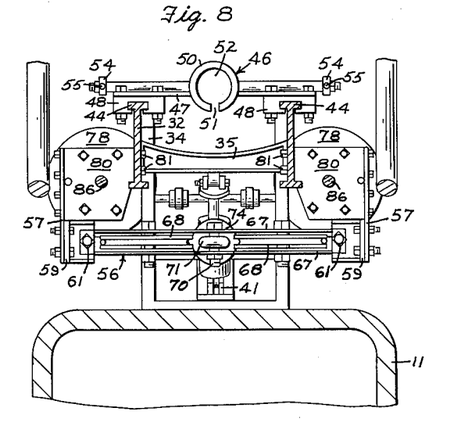
FIGURE 8 is a sectional view taken along line 8—8 in FIGURE 6A.
Figure 9:
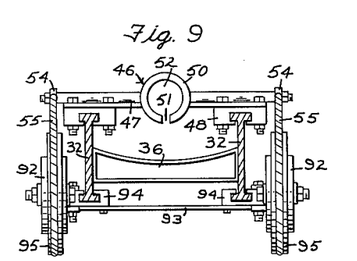
FIGURE 9 is a sectional view taken along line 9—9 in FIGURE 6B.
Figure 10:
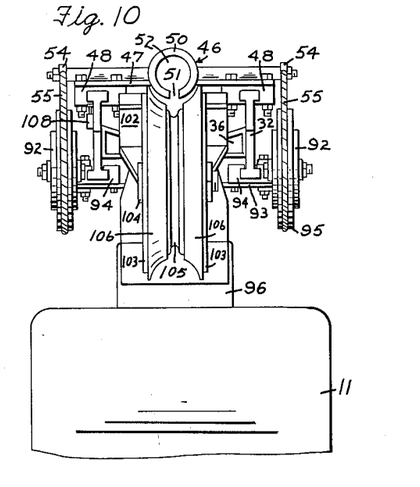
FIGURE 10 is an end view of the sheave assembly and tong thrower taken from the right end of FIGURE 6B.

The tong thrower assembly is best seen in FIGURES 6 and 7 and in the sectional views taken through these figures. The frame of the tong thrower consists of a pair of parallel I-beams 32 which are mounted in side by side spaced relation along the sides of the boom 10. The rearward end of the I-beam 32 is pivotally mounted about pivots 33 by means of a pair of triangular bracing frames 34 fixed to the top of the boom tip. The two I-beams 32 are rigidly joined by a pair of braces 35 and 36 which are welded or otherwise attached to the webs of the I-beams 32. Thus a rigid rail structure is provided with unobstructed side flanges at the top and the bottom thereof. The two I-beams 32 extend outwardly slightly beyond the outboard end of the boom 10 and partially cover the sides of the sheave assembly 16. At their outboard ends the lower flanges of the I-beams 32 are cut away as shown by the numeral 38 to provide clearance for the sheave assembly 16.

In order to provide for angular adjustment of the I-beams 32 with respect to the boom 10 a second pneumatic cylinder assembly 40 is provided. The lower end of the cylinder 40 is pivotally mounted between a pair of ears 41 fixed to a cross bar 42 mounted between the two triangular braces 34. The upper end of the piston rod 43 is pivotally connected to the lower surface of the brace 35 fixed between the two I-beams 32. Thus, when the cylinder assembly 40 is extended, the I-beams 32 will be raised angularly above the top of boom 10 and when the cylinder assembly 40 is contracted the I-beams 32 will assume a position parallel to boom 10 as seen in FIGURE 6. Again, since the amount of movement of cylinder assembly 40 can be regulated for constancy, the angle subtended by I-beams 32 with respect to the boom 10 will be constant each time the assembly 40 is actuated. This cylinder assembly 40 taken in conjunction with the previously described cylinder 29 will therefore insure the proper positioning of the I-beams 32 at an angle of 45 degrees with respect to the level ground on which the boom is presumed to be operating, thereby insuring the maximum trajectory of the tongs 18 when they are propelled.

The two I-beams 32 provide double rails consisting of upper flanges 44 and lower flanges 45. Slidably mounted on the two upper flanges 44 is the socket assembly generally designated by the numeral 46. The socket assembly 46 can best be seen in FIGURES 6A, 7A, 8, 9, and 10. The socket assembly 46 is an integral unit and includes a cross plate 47 slidably mounted on the two flanges 44 by means of bearing blocks 48, and a central enlarged tong socket 50. Socket 50 is circular in cross section and has a longitudinal slot 51 cut along its lower surface. Slot 51 is of sufficient width to insure the passage of the tong cable when it drops from the socket 50. Socket 50 is further provided with a longitudinal aperture 52 adapted to receive the tong cable when the tong is carried to the socket 50. The outboard end 53 of the socket 50 is adapted to abut the tongs 18. The side of the cross bar 47 is provided a cable mount 54 which is pivoted about an axis parallel to the flanges 44. The two mounts 54 are secured to opposite ends of a cable 55 which is utilized to accelerate the socket assembly 46.

The central portion of cable 55 is carried through a snubber apparatus which can be seen in FIGURES 6A, 7A, 8, 15, and 16. The snubber is generally designated by the numeral 56. It is mounted by a pair of side plates 57 which are bolted to the side of a pair of cylinders 58 which will be described in detail below. Cylinders 58 are fixedly secured to I-beams 32 and therefore the plates 57 are also fixed with respect to the I-beams 32. Fixed to the inner surfaces of the two plates 57 are four mounting brackets 59. The mounting brackets 59 in turn carry a pair of guide rods 60 which are secured by means of nuts 61 at each end thereof. A bearing collar 62 is fixed to each rod 60 by means of a threaded cap 63. Fixed to the bearing collar 62 is a back stop 64 having a pair of transverse parallel spaced plates 65. Slidably mounted on the bearing collar 63 is a snubber frame 66 having a pair of transverse parallel spaced plates 67. Rotatably mounted between the two plates 67 are a pair of pulleys 68 located in a horizontal plane. Pulleys 68 engage the intermediate portions of the cables 55. The plates 67 also mount a pin 70 which is received through the eye of a bolt 71 that extends rearwardly beyond the ends of the plates 65 and is capped by a nut 72. Between the nut 72 and the edges of the plate 65 is mounted a compression spring 73 which surrounds the shank 71. The spring 73 is capped by two mounting disks 74 located at each end thereof. Thus movement of the cables 55 in the direction shown by arrows 75 in FIGURE 16 will move the plate 67 relative to plate 65. However, this movement will be resisted by the force of the compression spring 73. The movement of the cables 55 is thereby resisted by the shock absorber qualities of snubber 56.

The cylinder 58 which is mounted at the outer side of each I-beam 32 consists of a cylindrical body 76 capped at its rearward end by a plate 77. The plate 77 is fixed to the open end of a reservoir 78 whose interior opens to the interior of the cylindrical body 76. The outboard end of the body 76 is covered by a casting 80 which is bolted directly to the flanges of the I-beams 32 by means of cap screws 81. The casting 80 abuts and seals the outboard end of the cylindrical body 76. It has a reduced inner diameter with respect to diameter of the body 76. This reduced area is designated by the numeral 82. The object of this reduced area is to provide a cushioned end for the slidable piston which is generally designated by the numeral 83. Piston 83 is of common design and incorporates a sealing ring 84 and a reduced diameter portion 85 formed to slide very tightly within the reduced area 82. The piston 83 is secured to piston rod 86 by means of a nut 87 and a pair of washers 88. Piston rods 86 extends toward the outboard end of the I-beams 32 and are respectively terminated by a mounting bracket 90 which has a first part 91 fastened directly to the piston shaft 86 and spaced second parts 92 which are secured to the part 91. As may be seen in FIGURE 7B and FIGURE 9 the two parts 92 are joined by a cross member 93 which extends across the lower flanges 45 of the I-beams 32 and which carries two bearing blocks 94 slidably mounted on the lower flanges 45 of I-beams 32. This feature maintains the two mounting elements 90 in side by side relation on the I-beams 32.

Rotatably mounted between the two spaced parts 92 of each mounting element 90 is a pulley 95. The pulleys 95 abut the cable 55 intermediate the socket element 46 and the snubber pulleys 68. Since the center portion of cable 55 is fixed except for the resilient action of spring 73, the pulleys 95 are capable of producing outbound motion of socket element 46 equal to twice the motion of piston rod 96. This motion will continue until the cable 55 assumes a vertical position above the pulleys 95.

Figure 11:
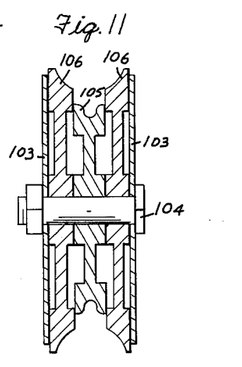
FIGURE 11 is a sectional view taken through the sheave assembly along lines 11—11 in FIGURE 6B.
Figure 12:
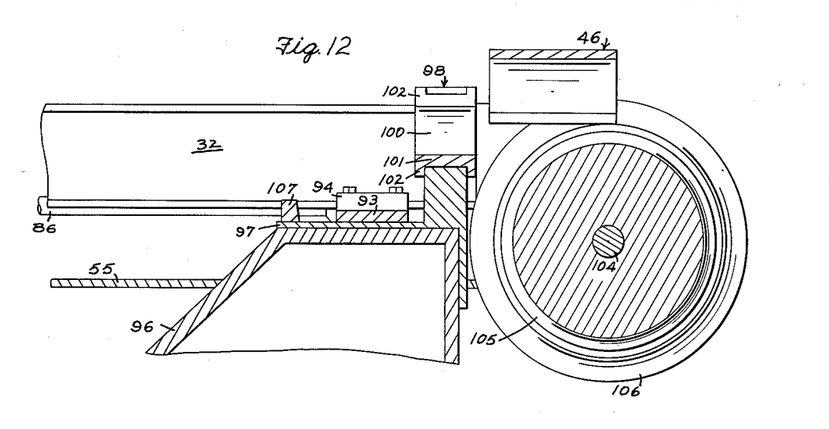
FIGURE 12 is a sectional view through the tong thrower and sheave assembly taken along line 12—12 in FIGURE 7B.
Figure 13:
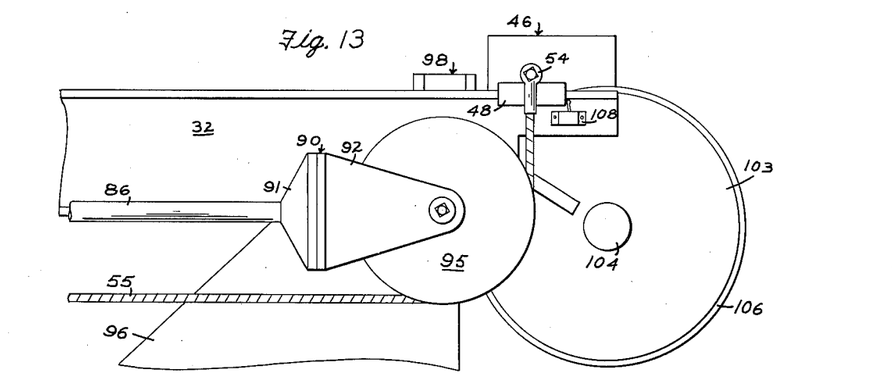
FIGURE 13 is a side view of the outboard end of the tong thrower and boom similar to the right hand end of FIGURE 6B but showing the tong socket in its fully extended position.
Figure 14:
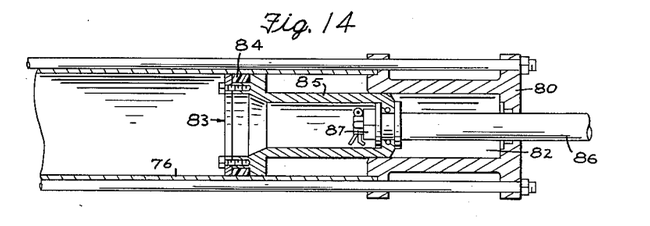
FIGURE 14 is a sectional view through the outboard end of the cylinder and piston assembly taken along the line 14—14 in FIGURE 7A with the piston fully extended.
Figure 15:
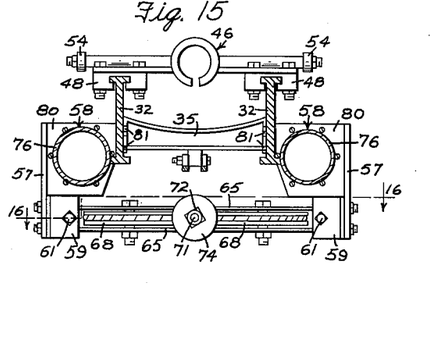
FIGURE 15 is a sectional view taken along line 15—15 in FIGURE 6A.
Figure 16:
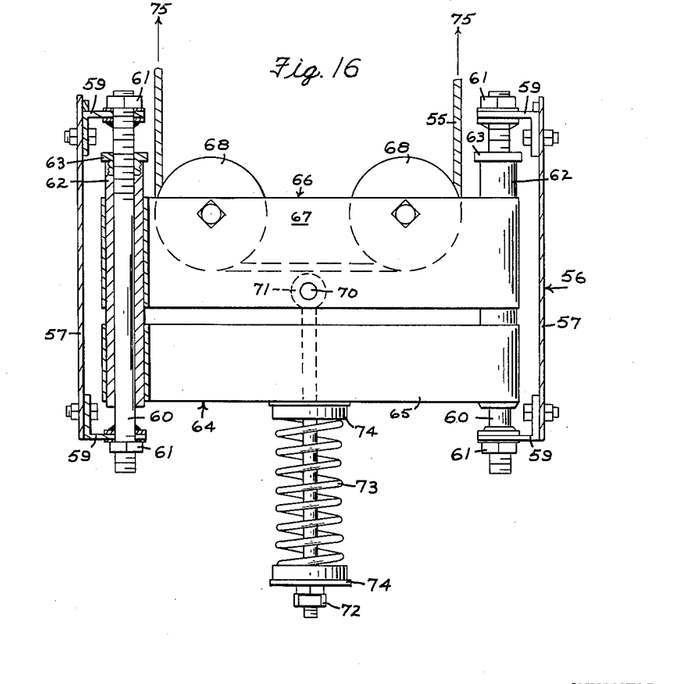
FIGURE 16 is a sectional view taken along the line 16—16 in FIGURE 15 showing the snubber assembly.
Figure 17:
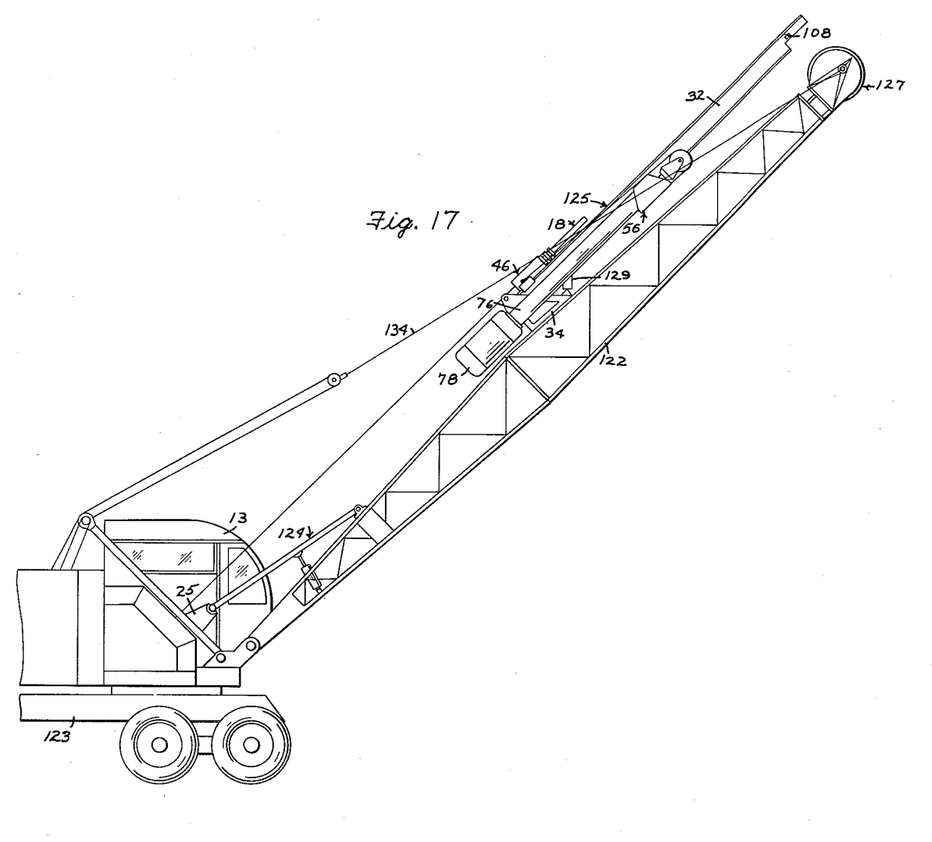
FIGURE 17 is a side view of this invention mounted on a pole boom with the tong thrower in its fully loaded position preparatory to the throwing of the tongs.
Figure 18:
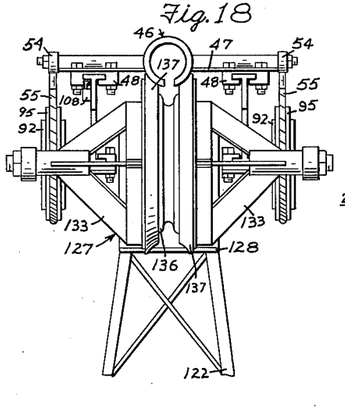
FIGURE 18 is an end view of the boom assembly seen in FIGURE 17 looking down the boom and showing the tong thrower in its position after firing of the tongs.
Figure 19:
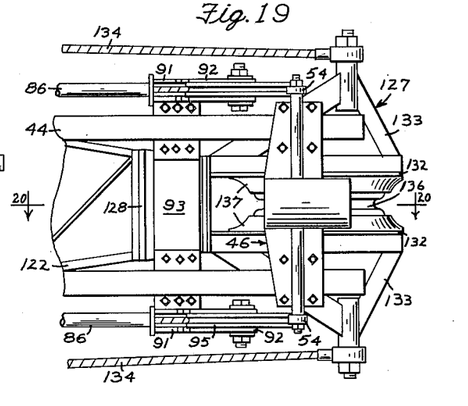
FIGURE 19 is a top view of the assembly as seen in FIGURE 18 showing only the outboard end of the boom.
Figure 20:
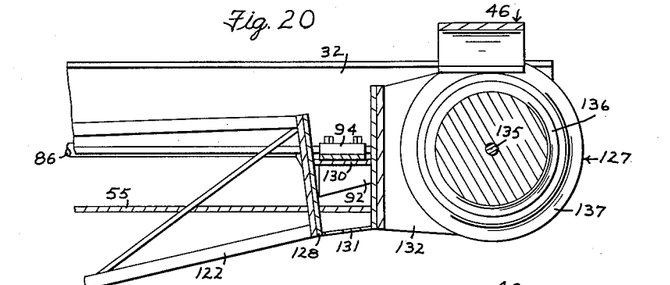
FIGURE 20 is a sectional view taken along lines 20—20 in FIGURE 19.
Figure 21:
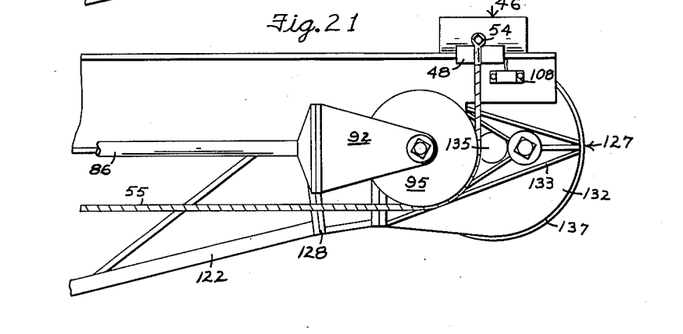
FIGURE 21 is a side view of the assembly as seen in FIGURE 20.

The sheave assembly 16 for a heel boom consists of a pedestal 96 adapted to be attached to the existing heel boom 10 by any suitable method. As seen in FIGURES 12 and 13, a cross plate 97 extends across the top of pedestal 96 and has a raised socket 98 fixed thereto. The socket 98 is provided with a longitudinal aperture 100 which seats a collar 101 having side flanges 102. Collar 101 is rotatably mounted about a longitudinal axis through the center of socket 98. Collar 101 is fixed to a pair of outwardly extending side plates 103 which are secured to collar 101 at their upper ends. As seen in FIGURE 11, a central mounting bolt assembly 104 is secured between the two plates 103. Bolt assembly 104 rotatably carries the cable sheave 105 and two adjacent idler sheaves 106 which have contours complementary to the socket 50 and which are designed to idly support the lower surface of the socket 50.

The upper portions of both the socket 98 and the collar 101 are provided with a longitudinal slot sufficiently wide to receive the tong cable 126. The slots will ordinarily be aligned, since the offset weight of the plates 103 and sheaves 105, 106 will tend to maintain the sheave assembly 16 in a vertical position. The purpose of the socket 98 is to allow the sheave assembly 16 to tilt about a longitudinal axis with respect to boom 10 when dragging logs located at the side of boom 10.

Also fixed to the top surface of plate 97 is a short vertical ledge 107. Ledge 107 serves as a limiting stop in guiding the cross bar 93 which rests on the plate 97 when the tongs 18 are out.

The final position of the pulleys 95 and socket assembly 46 is shown in FIGURES 12 and 13. In this position, the cross bar 93 rests on plate 97 between ledge 107 and socket 98. The outboard end 53 of socket 50 is diametrically above bolt assembly 104 and socket 50 rests on the idler sheaves 106. The cable sockets 54 are tangentially above the pulleys 95 and the ends of cable 55 are perpendicular to the piston rods 86. The bearing blocks 48 are in contact with a switch 108 secured to one of the I-beams 32. Switch 108 will be explained below.

Figure 24:
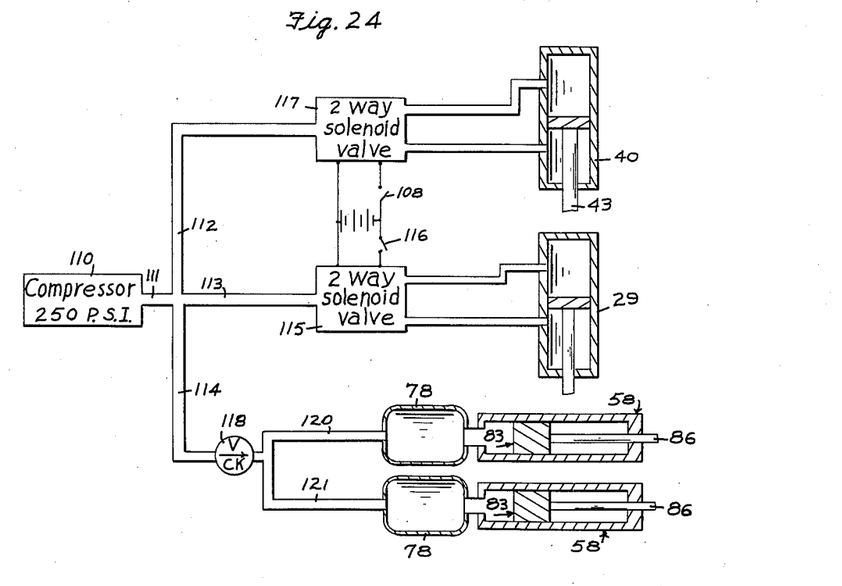
FIGURE 24 is a somewhat schematic diagram showing the pneumatic circuits which control the various cylinders used to operate the invention.

The pneumatic system for this tong thrower is shown in FIGURE 24. The air for the system is compressed by a conventional compressor assembly 110, which is preferably mounted on framework 12. The main supply hose 111 opens to three branch hoses 112, 113, and 114. Hose 113 is connected to a common two way solenoid valve 115 which controls the double acting cylinder 29 of the brace structure 20. The valve 115 is controlled by a manual switch 116 located within cab 13 and being under the control of the boom operator. The hose 112 is connected to a second two way solenoid valve 117 which controls the double acting cylinder 40 that pivots the I-beams 32 with respect to boom 10. Solenoid valve 117 is controlled by the previously described switch 108. When switch 108 is contacted by bearing blocks 48 the solenoid valve 117 acts to move piston rod 43 into cylinder 40 to thereby bring I-beams 32 adjacent to boom 10. Switch 108, when released by blocks 48, will reverse valve 117 to thereby cause cylinder 40 to lift I-beams 32.

The third hose 114 is connected by a check valve 118 and two hoses 120, 121 to the interior of reservoirs 78. The purpose of compressor assembly 110 is to maintain the minimum pressure required within reservoirs 78 and the cylinders 58. Air is prevented from escaping to compressor assembly 110 by the check valve 118.

*Operation*

Figure 22:
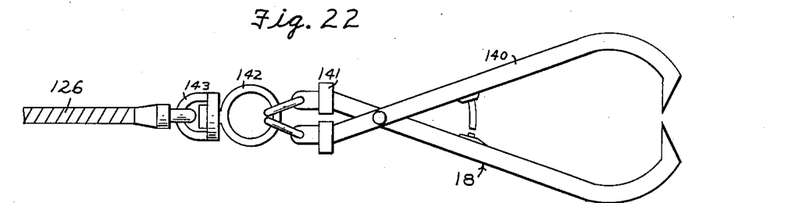
FIGURE 22 is a side view of the tong device which is to be propelled by this invention.
Figure 23:
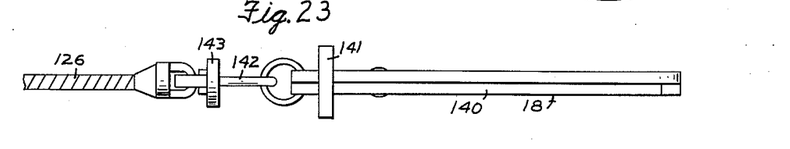
FIGURE 23 is a top view of the tong device shown in FIGURE 22.

The operation of this invention is quite simple. As seen in FIGURES 22, 23 the tongs 18 have a pair of pivoted jaws 140 which have stops 141 fixed on their upper ends. Jaws 140 are joined by a ring 142 carried in a swivel mount 143 secured to the tong cable. As the cable 126 is drawn inward by the drum on framework 12, the tongs 18 may be used to load logs in the normal fashion. In this case, cable 126 passes through collar 101 and over cable sheave 105, which is free to pivot about the longitudinal axis of collar 101.

When the tong is to be thrown, the boom operator activates switch 116 to thereby extend the brace assembly 20 which is then drawn back by the usual boom supports until the abutments 24 are seated in the recesses of elements 25. The boom 10 is then locked in proper angular position with respect to the ground. The operator then continues to reel in cable 126 until the tongs 18 pass over the idler sheaves 106 and fit within the aperture 52 of socket 50. When the stops 141 abut the edge 53 of socket 50, the cable 126 will begin to pull socket 50 rearwardly along the I-beams 32. As soon as switch 108 is released by blocks 48, the cylinder 40 will swing the I-beams 32 upwardly to the firing position.

The tong thrower is charged solely by the pulling action of the cable 126. As cable 126 draws the tongs 18 back, the piston rods 86 are forced back into the cylinder 58 toward the reservoirs 78, thereby further compressing the air within these cylinders. Depending upon the distance of throw required, the tongs 18 will be stopped somewhere along I-beams 32. This can be accurately gauged by markings along the I-beams 32 or by a pressure gauge connected to a reservoir 78.

To throw the tongs 18, the cable 126 is quickly released by the drum on frame 12. This is done by first releasing the driving clutch and then releasing the brakes. The air in reservoir 78 and cylinders 58 then expands rapidly, forcing the pistons 85 outward. The accellerated motion is transmitted through cable 55 to socket 50, which moves at twice the speed of pistons 85. The tongs 18 are accelerated very rapidly until they fly free when the cable 55 is fully extended. The impact created by the socket 50 is eased by the snubber spring 73. The switch 108 is again contacted, thereby causing cylinder 40 to release I-beams 32. Cylinder 40 caused I-beams 32 to lower. The tongs 18 will fly to the desired location, winding cable 126 from the control drum, which must be braked quickly at the end of travel to prevent backlash. The tongs 18 are then used in normal fashion, the entire process being repeated for each throw.

A second embodiment of the invention as applied to a derrick boom is shown in FIGURES 17 to 21. The boom 122 is shown mounted on a mobile framework 123 similar to that previously described and provided with the usual controls. Again, a brace assembly 124 is used to properly position boom 122 with respect to framework 123 in preparation for use of the tong thrower. Assembly 124 is identical, in both structure and control, to the previously described assembly 20.

The tong thrower is generally designated as 125 and is pivotally supported on the upper surface of boom 122. The tong thrower 125 includes a cylinder assembly 126 interconnecting it and boom 122 for angular positioning of tong thrower 125 with respect to boom 122. Cylinder assembly 129 merely pivots the tong thrower 125 to a position wherein it subtends an angle of 45 degrees with respect to the horizontal when the brace assembly 124 is in place.

Since the tong thrower 125 is identical in all respects to that shown in the first-described embodiment, it will not be further described. Identical numerals have been used in the drawings to designate identical elements of each embodiment.

The main difference between the device in FIGURES 17–21 lies in the sheave assembly 127 mounted at the outboard end of boom 122. This sheave assembly 127 consists of an angularly positioned mounting plate 128 secured to boom 122 in any suitable manner, extending from plate 128 are two braces 130, 131 which carry the side plates 132 of the sheave assembly. Outer braces 133 are fixed to plates 132 and carry the ends of the support cables 134 used to elevate boom 122. A central bolt assembly 135 is carried between plates 132 in a horizontal position. Rotatably mounted on assembly 135 is a central cable sheave 136 and a pair of idler sheaves 137 located respectively on each side of sheave 136. The sheaves are identical to the previously described sheaves 105, 106.

The operation of this embodiment is identical to that described earlier. At its outer position, the cross member 93 will rest on brace 130 which will support I-beams 32 adjacent boom 122. The two I-beams 32 will again straddle the sheave assembly 127. The tongs are thrown in a fashion identical to that described above and boom 122 is used in its normal fashion to move and lift the logs held by tongs 18.

*Practical Considerations*

The above described tong thrower was devised to throw a pair of tongs 18 a distance of 400 feet. To do so at an initial angle of 45 degrees requires an initial velocity of 113.2 feet per second and will carry tongs 18 a maximum height of 100 feet. Such a force is not practically obtainable using mechanical springs. For this reason, compressed air was chosen as the propellant.

For a typical installation, the total weight of the tongs 18 is 71 pounds. The weight of the socket assembly 46 is 28.5 pounds. The weight of the cable 55 is 6 pounds. To move this mass at a velocity of 113.2 feet per second requires a kinetic energy of 21,000 foot-pounds. In addition, 6,800 foot-pounds of kinetic energy are needed to move piston 83, piston rods 86 and the mounted pulleys 95. However, these demands are overshadowed by the kinetic energy necessary to overcome the inertia of the winch drum and 500 feet of 5/8 inch wire rope (cable 126), which totals 93,500 foot-pounds. Thus the total kinetic energy needed is 121,300 foot-pounds.

To obtain this energy I contemplate the use of a cylinder body 76 having a length of 7 feet and an inner diameter of 6 inches. The inner diameter of each reservoir 78 will be about 13 inches and the reservoir 78 will have an inner length of 2½ feet. This will result in a total volume of over 7 cubic feet.

The pressure in reservoirs 78 is maintained at a minimum of 250 pounds per square inch gauge or 265 p.s.i. absolute. The compression of air within cylinder 58 and reservoir 78 by drawing back socket assembly 46 is isothermal and will increase the pressure to a maximum of 447 p.s.i. absolute. When socket assembly 46 is released, expansion of this air is adiabatic and will decrease the pressure with an explosive force to 228 p.s.i. absolute. The lost pressure must then be renewed by compressor assembly 110 before the next throw. At these pressures, the total kinetic energy available is about 176,000 foot-pounds. Taking into account air resistance, friction and inertial drag, it appears that these pressures will be able to throw tongs 18 about 450 feet.

Various modifications may appear to those skilled in this art without deviating from the invention. It is possible that design changes may be necessary to adapt the tong thrower to other types of booms. In any event, the above disclosure is not intended to limit the invention, except as it is defined in the following claims.

Having thus described my invention, I claim:

1. In a combination with a logging boom having a supporting framework, a tower mounted on such framework, a cable support sheave assembly mounted at the outboard end of the tower, a cable drum mounted on said framework, a cable wound on said drum extending outwardly over the sheave assembly and a tong device mounted on the end of the cable;

a tong thrower comprising a frame mounted on said tower extending outwardly along said tower to the outboard end of said tower, said frame including rail means extending longitudinally thereon;

socket means slidably mounted on said rail means for longitudinal movement adapted to be abutted by said tong device;

air cylinder means mounted on said frame parallel to said rail means, including slidable piston means projecting therefrom toward the outboard end of said rail means;

and cable means operatively connected between said socket means and said frame, said cable means being abutted by said piston means intermediate said socket means and said frame.

2. The combination as defined in claim 1 wherein said air cylinder means comprises a pneumatic cylinder on said frame in fixed relation thereto;

a piston slidably mounted within said cylinder;

cushioning means formed within said cylinder at the outboard end thereof;

and reservoir means opening directly to said cylinder at the opposite end thereof;

and air supply means operatively connected to said reservoir means incuding check valve means intermediate said air supply means and said reservoir means adapted to prevent escape of air from said reservoir means to said air supply means.

3. The combination as defined in claim 1 wherein said cable means comprises a snubber apparatus having a fixed portion on said frame and having a movable portion slidably mounted on said rail means, said movable portion being operatively connected to said fixed portion by means including a resilient shock absorbing member.

4. The combination as defined in claim 1 wherein said rail means comprises a pair of spaced parallel I-beams mounted in vertical position with the flanges thereof in planes transverse to the tower;

and spacing members rigidly connecting the flanges of said I-beams to form a rigid rail structure.

5. The combination as defined in claim 1 wherein said socket means comprises a socket element having a longitudinal aperture cut therethrough and including an outboard end adapted to abut the tong device, said aperture being adapted to receive the cable carrying the tong device;

said socket means further including a slot formed along the lower length thereof adapted to allow the cable to fall from the socket means when said tong device is released therefrom.

6. In combination with a logging boom having a support framework, a tower mounted on said framework, a cable supporting sheave assembly mounted at the outboard end of the tower, a cable drum mounted on said framework, a cable wound on said drum extending outwardly over the sheave assembly and a tong device mounted on the end of the cable;

a tong thrower comprising a frame pivotally mounted at one end thereof on said tower about a transverse axis and extending outwardly along said tower from its pivotal mount to the outboard end of said tower, said frame including rail means extending longitudinally thereon;

socket means slidably mounted on said rail means for longitudinal movement adapted to receive the cable and to abut said tong device;

air cylinder means mounted on said frame parallel to said rail means, including movable piston means projecting toward the outboard end of said rails;

cable means operatively connected to said frame and to said socket means said cable means being abutted by said piston means intermediate said frame and said socket means;

and means operatively connected between said tower and said frame adapted to vary the angular position of said frame with respect to said tower.

7. The combination as defined in claim 6 wherein said last named means comprises a pneumatic cylinder having a base pivotally mounted at one end on said tower and having a movable piston rod pivotally mounted at its outer end to said frame, said cylinder being adapted to angularly position said frame with respect to said tower.

8. The combination as defined in claim 6 further including brace means mounted on said tower at the lower end thereof adapted to abut the framework to therebw limit movement of the tower toward the framework.

9. In combination with a logging boom having a supporting framework, a tower pivotally mounted on said framework for movement about a horizontal axis, a cable supporting sheave assembly mounted at the outer end of the tower, a cable drum carried by said framework, a cable wound on said drum extending outwardly over the sheave assembly and a tong device mounted at the outer end of the cable;

a tong thrower comprising a frame having a pair of parallel or longitudinal I-beams rigidly connected together and spaced from one another at either side of the tower, said frame being pivotally mounted at one end thereof on the upper surface of the tower, said frame being adapted to extend outwardly along said tower to the outboard end of the tower and being adapted to straddle the sheave assembly;

socket means slidably mounted on said I-beams along the top flanges thereof for longitudinal movement along said I-beams, said socket means including an apertured member adapted to be abutted by the tong device and to slidably receive the cable when said tong device abuts said member;

cable means fixed to said socket means, said cable means including a shock absorbing assembly operatively connected to said frame adapted to resiliently allow a limited amount of movement of said socket means relative to said frame when said cable means is fully extended;

air cylinder means mounted on said frame parallel to said I-beams and at the side thereof, including movable piston means projecting toward the outer end of said rails, said piston means terminating at the outboard end thereof in a rotatably sheave means adapted to abut said cable means intermediate said socket means and said frame;

and means operatively connected between said tower and said frame adapted to vary the angular position of said frame with respect to said tower.

10. The combination as defined in claim 9 further comprising control means fixed to said frame at the outboard end thereof in the path of said socket means, said control means being operatively connected to said last named means and adapted to operate said last named means in response to the position of said socket means along said frame.

11. A propelling device, comprising:
a framework;
an object secured to one end of a flexible cable;
means mounted on said framework operatively connected to the remaining end of said cable selectively adaptable to pull said cable and said object toward the framework;
outwardly extending rail means mounted on said framework interposed parallel to the path of said cable outward from said means;
socket means slidably mounted on said rail means for longitudinal motion relative thereto, said socket means being adapted to be abutted by said object when pulled toward said framework by said means;
air cylinder means mounted on said rail means parallel thereto and including piston means projecting therefrom toward the outer end of said rail means;
and cable means operatively connected between said socket means and said rail means, said cable means being abutted by said piston means intermediate said socket means and said rail means.

12. The combination as defined in claim 11 wherein said air cylinder means comprises a pneumatic cylinder on said rail means in fixed relation thereto;
a piston slidably mounted within said cylinder;
cushioning means formed within said cylinder at the outboard end thereof;
and reservoir means opening directly to said cylinder at the opposite end thereof;
and air supply means operatively connected to said reservoir means including check valve means intermediate said air supply means and said reservoir means adapted to prevent escape of air from said reservoir means to said air supply means.

13. A propelling device, comprising:
a framework;
an object secured to one end of a flexible cable;
means mounted on said framework operatively connected to the remaining end of said cable selectively adaptable to pull said cable and said object toward the framework;
outwardly extending rail means mounted on said framework interposed parallel to the path of said cable outward from said means;

socket means slidably mounted on said rail means for longitudinal motion relative thereto, said socket means being adapted to be abutted by said object when pulled toward said framework by said means;

air cylinder means mounted on said rail means parallel thereto and including piston means projecting therefrom toward the outer end of said rail means;

and means operatively connected between said piston means and said socket means adapted to transfer motion of said piston means to said socket means at an increased rate of acceleration.

14. A propelling device, comprising:

a framework;

an object secured to one end of a flexible cable;

means mounted on said framework operatively connected to the remaining end of said cable selectively adaptable to pull said cable and said object toward the framework;

outwardly extending rail means mounted on said framework interposed parallel to the path of said cable outward from said means;

socket means slidably mounted on said rail means for longitudinal motion relative thereto, said socket means being adapted to be abutted by said object when pulled toward said framework by said means;

air cylinder means mounted on said rail means parallel thereto and including piston means projecting therefrom toward the outer end of said rail means;

and flexible means operatively anchored to said rail means and extended forwardly therefrom about the free end of said piston means, then rearwardly to engagement with said socket means, whereby upon extension of said piston means the socket means is propelled forwardly at twice the rate of advance of said piston means.

References Cited in the file of this patent

UNITED STATES PATENTS

| | | |
|---|---|---|
| 2,710,167 | Sandland | June 7, 1955 |
| 2,878,946 | Wirkkala | Mar. 24, 1959 |